March 29, 1955  P. V. MILLER  2,704,917
SPINDLE INDICATOR

Filed June 24, 1952  2 Sheets-Sheet 1

INVENTOR.
PAUL V. MILLER
BY
Watson Johnson Leavenworth & Blair
ATTORNEYS

March 29, 1955 P. V. MILLER 2,704,917
SPINDLE INDICATOR

Filed June 24, 1952 2 Sheets-Sheet 2

INVENTOR.
PAUL V. MILLER
BY
Watson Johnson Leavenworth & Blair
ATTORNEYS

United States Patent Office 2,704,917
Patented Mar. 29, 1955

2,704,917

SPINDLE INDICATOR

Paul V. Miller, Woonsocket, R. I., assignor to The Taft-Peirce Manufacturing Company, Woonsocket, R. I., a corporation of Rhode Island Application June 24, 1952, Serial No. 295,320

4 Claims. (Cl. 51—232)

The invention is concerned with improvements in machine tool constructions and particularly with an indicator means built into a machine tool carriage or table adapted to display at a point readily observable at the exterior of the carriage the position of a spindle adjustably mounted and supported within the interior of the carriage and normally obscured from view.

As particularly disclosed herein the invention is embodied in a machine tool of the surface grinding type in which a work carrying spindle is mounted in a generally vertical position within a carriage translatable horizontally on the pedestal or base of the machine. A machine of the type referred to incorporates means for angularly adjusting the spindle in a vertical plane and includes also means such as an electric motor with a drive for rotating the spindle all carried as a unit on spaced supports upon which the unit is angularly adjustable. Such a unit including spaced supporting trunnions therefor which enable the angular adjustment, is normally mounted within the interior of the carriage with various mechanical parts necessarily intervening between the unit and the exterior portions of the carriage such that the angular position of the spindle is not clearly exposed nor readily determinable.

The present invention comprises a built in indicator means for displaying at a readily observable point at the exterior of the carriage the direction and degree to which the spindle is adjusted. It is marked by a simplicity of construction and an arrangement of operating parts such as to render it thoroughly dependable and exact including an amplification whereby the spindle position is easily read to a fine degree. Other features and advantages will be made apparent from the embodiment to be described.

The invention accordingly comprises the features of construction, combination of elements, and arrangement of parts, which will be exemplified in the construction hereinafter set forth and the scope of the invention will be indicated in the claims.

Reference should be had to the following detail description taken in connection with the accompanying drawings in which:

Fig. 1 is a vertical cross-sectional view through a machine tool carriage showing particularly the work spindle mounted vertically therein;

Fig. 2 is a somewhat diagrammatic view of a machine tool omitting various details but indicating generally the type of machine of which Figure 1 is a cross-sectional view of the upper working portion thereof;

Figures 1, 2:
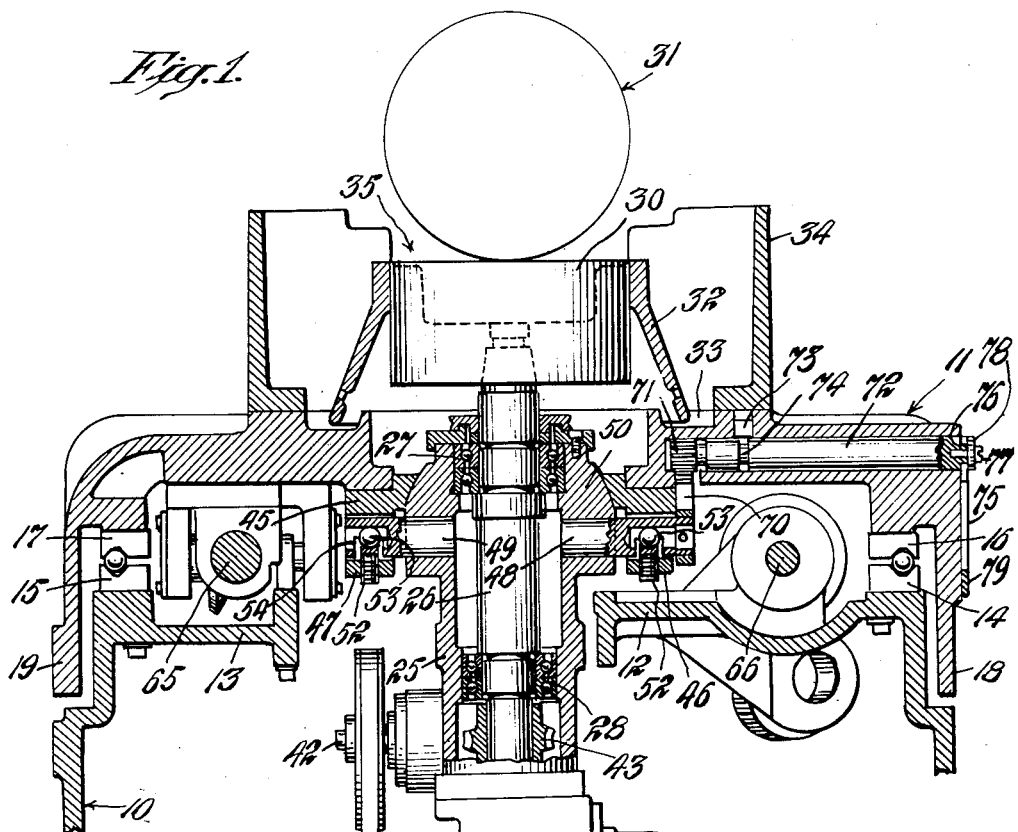

The invention is shown embodied in a machine tool of a type commonly referred to as a surface grinder. It is generally similar to the machine disclosed in my prior issued Patent No. 2,375,128. Such a machine includes a main supporting pedestal or base 10 upon which is mounted a carriage or table 11. The pedestal has upper generally horizontal portions 12 and 13 as indicated in Figure 1 upon which the carriage 11 is freely translatable in a horizontal direction through the medium of suitable ball bearing guideways including the spaced stationary guideway strips 14 and 15 secured to the frame parts 12 and 13 respectively and the complementary guideway strips 16 and 17 secured to the inner surface of the upper part of the carriage 11.

As shown in Figure 1, particularly as supplemented in Figure 2, the carriage is generally box-like in character and has outer wall or depending skirt portions including the side wall portions 18 and 19 shown particularly in Figure 1 and the front wall portion 20 indicated in Figure 2. The latter figure shows a pair of wheels 21 and 22 adapted to be hand-operated and connected to appropriate mechanism for adjustment of the machine tool parts, but this figure is largely diagrammatic and incomplete as to details and is intended merely to show the general type of machine of which Figure 1 is a vertical section.

The carriage has supported therein a housing part 25 in which is rotatably mounted a spindle 26 through the medium of upper ball bearings 27 and lower ball bearings 28. The upper end of the spindle 26 is adapted to have supported thereon a work piece by any suitable means such as by a magnetic chuck indicated generally at 30. The machine tool embodies suitable supports and driving means for a grinding wheel such as indicated in outline at 31. The details of this latter mechanism are omitted since they form no part of the present invention. It is sufficient to note that in the normal operation relative motion is provided between the grinding wheel and the work piece including the translation of the carriage 11 on its supporting ways. As shown the chuck is provided with a depending flaring skirt 32 the lower edge of which extends into an annular trough 33 for the collection and drainage of the grinding liquid. Mounted on the upper surface of the carriage in fixed relation thereto is an annular protecting wall 34 extending around the chuck except at the cut out section 35 at the rear.

A suitable driving means is associated with the spindle 26 for rotating it, including in the particular form disclosed an electric motor 40 adapted to drive through suitable pulleys and the belt 41 the shaft 42 which is connected to rotate the worm gear 43 secured to the work spindle 26. Some of the details of the drive connection are omitted in Figure 1 as being of no importance with respect to the particular invention, but in general it is noted that the motor 40 and the driving connection to the spindle are secured to the housing part 25 so as to comprise a unit adapted to be supported and tilted as such through parts which will now be described. Secured to the main casting part of the carriage or table 11 is an annular ring 45 having depending bearing ears 46 and 47 within which are mounted the respective spaced radially extending trunnions 48 and 49 secured in and projecting from the spindle housing 25. The upper end of the housing 25 has a spherical portion 50 adapted to fit within a complementary correspondingly shaped inner annular surface of the ring 45. The vertical position of the ball portion 50 within its supporting ring 45 may be adjusted through means which includes set screws 52 threaded through the respective ears 46 and 47 into hollow outer ends of the corresponding trunnions, the set screws having concave upper ends in which are seated balls 53 adapted to engage against the inner surface of the holes formed within the trunnions. The openings 54 in the walls of the trunnions for the set screws 52 have a considerable angular extent around the trunnions as a clearance enabling the trunnions to be turned in the supporting ears a sufficient angle for adjustment of the spindle position.

Figure 3:
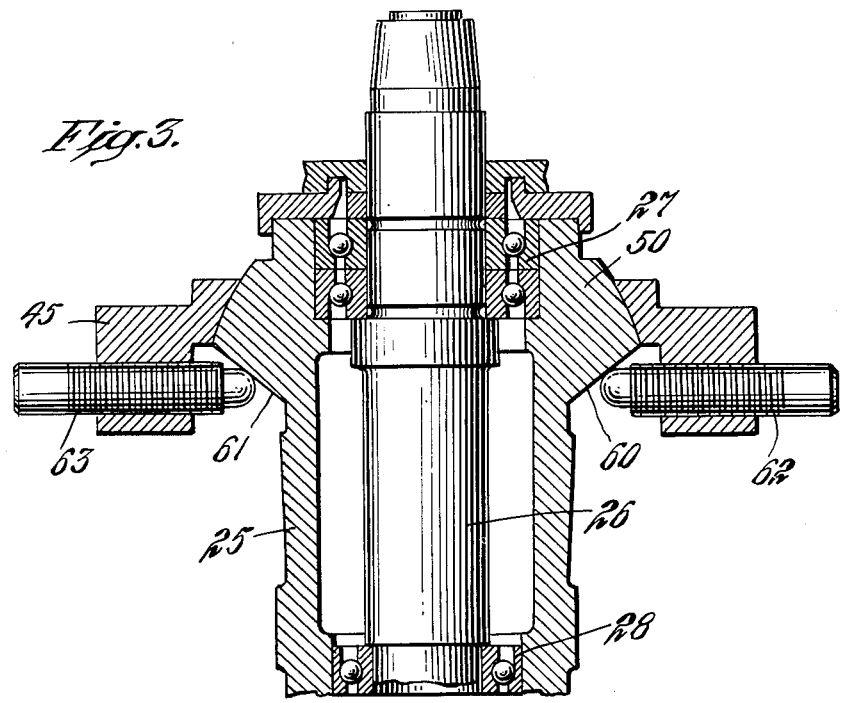
Fig. 3 is a cross-sectional view through the upper portion of the spindle taken at right angles to the section of Figure 1 and showing particularly the means for tilting or angularly adjusting the spindle.

The means for tilting or angularly adjusting the spindle 26 and its associated mechanism including the housing 25 and the respective trunnions 48 and 49 is shown particularly in Figure 3 which is a view taken through the spindle at right angles to the cross section of Figure 1. The ball portion 50 of the housing 25 at this section has inclined bottom faces 60 and 61 against which adjusting screws 62 and 63 are adapted to engage. It will be understood that by appropriate adjustment of the set screws 62 and 63 the spindle 26 may be angularly adjusted about its trunnion supports in a vertical plane corresponding to the vertical section of Figure 3 or corresponding to a vertical plane through the axis of the spindle 26 perpendicular to the section of Figure 1.

It will be noted that the spindle and its associated mechanism including the trunnions 48 and 49 and their supports are located interiorly of the carriage 11 and are substantially obscured from view normally and that there are in fact various machine parts which conveniently or necessarily intervene between the trunnions and the outer portions of the carriage. For example, as appears in Figure 1 a shaft 65 extends parallel to the ways of the machine to which the hand-operated wheel 22 is connected and which through appropriate additional mechanism is adapted to move the carriage 11 on its horizontal ways. Also as shown in Figure 1 a shaft 66 is located adjacent the outer end of the trunnion 48 to which the hand-wheel 21 is connected, this shaft and associated mechanism being required for adjustment of certain other parts of the machine.

In a machine of the character concerned it is quite important that there be means for informing the operator of the angular position of the work spindle 26 and the machine here described embodies a very effective and useful means for that purpose. As appears in Figure 1 the right hand trunnion 48 is extended radially outward for a greater distance than the opposite trunnion and has secured thereto a gear segment 70 having teeth meshing with a small gear 71 formed on, or secured on, a shaft 72 rotatably mounted in the upper part of the carriage 11 and extending outwardly to the right in Figure 1 to the exterior of the carriage beyond the outer face of the skirt portion 18. Axial movement of the shaft 72 is normally restrained by means of a plunger 73 having a finger extending into an annular groove 74 formed in the operating shaft 72.

Figure 4:
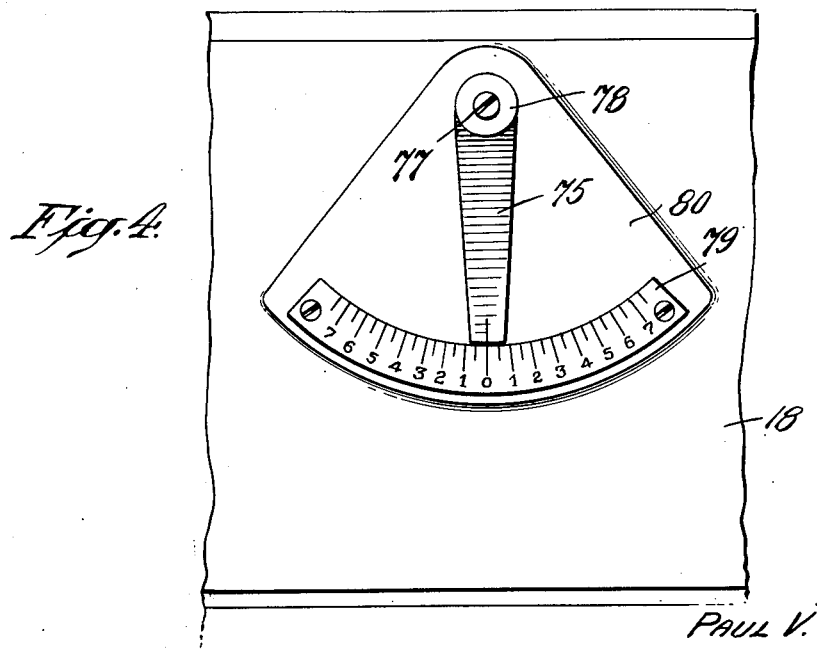
Fig. 4 is a fragmentary enlarged detail view of the indicator itself looking from the right in Figure 1.

As shown in Figures 1 and 4 an indicator finger 75 is mounted over a reduced portion 76 of the shaft 72 and is secured thereon by a screw 77 and an intervening washer 78. The finger 75 is associated with an arc-shaped indicator segment 79 secured in appropriate position on a boss 80 formed on the outer surface of the carriage skirt portion 18. The indicator segment 79 is provided with suitable graduations or markings to provide a reading in connection with the finger 75 of the angular position of the spindle 26 in either direction from the vertical. An angular adjustment of about 7½° in either direction from the vertical is generally sufficient for a machine of this character, which means a total angular movement of 15°. It will be noted, however, that the operating connections described provide an amplification such that the angle covered by the finger 75 is considerably in excess of 15° and a more accurate and finer reading is thus obtainable. Particularly the indicator means is located at a point where it may be easily examined and observed by an operator.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim:

1. In a machine tool, a supporting base, a carriage including outer enclosing side portions said carriage being mounted on and translatable on horizontal ways on said base, a spindle mounted in said carriage including a housing in which said spindle is rotatably supported, a pair of trunnions extending horizontally from said housing and bearing supports therefor in said carriage said trunnions and bearings being located interiorly of and normally obscured from view within said carriage, means mounted in said carriage for angularly adjusting said housing on its trunnions and thereby the position of said spindle, an operating shaft rotatably mounted in said carriage located above but associated with one of said trunnions and extending to the exterior of the carriage, an operative connection from said last named trunnion to said shaft for rotating the latter in accordance with the rotation of the trunnion, and a graduated means located at the exterior of a side portion of the carriage embodying a member mounted on said shaft at its outer end and adapted to be swung in an arc by rotation of said shaft and graduated scale means associated therewith thereby to indicate the adjusted position of the said last named trunnion and accordingly of the spindle.

2. In a machine tool, a supporting base, a carriage including outer enclosing side portions said carriage being mounted on and translatable on horizontal ways on said base, a spindle mounted in said carriage the mounting means including a housing in which said spindle is rotatably supported, a pair of trunnions extending horizontally from said housing and bearing supports therefor in said carriage said trunnions and bearings being located interiorly of and normally obscured from view within said carriage, means mounted in said carriage for angularly adjusting said housing and its trunnions and thereby the position of said spindle, a gear segment secured to one of said trunnions, an operating shaft rotatably mounted in said carriage, a gear connection between said segment and shaft for rotating the latter by the rotation of the corresponding trunnion, said gear segment and gear connection being constructed and arranged to provide a proportional but amplified rotation of said shaft with respect to the rotation of the corresponding trunnion, said operating shaft extending to the exterior of said carriage, and a graduated indicator means including an indicator segment secured to the outer end of said shaft located at the exterior of a side portion of the carriage where it is readily visible and adapted to indicate the angular position of the trunnions and thereby of the spindle.

3. In a machine tool, a supporting base, a carriage of box-like character including outer vertical side portions said carriage being mounted on and translatable on horizontal ways provided on said base, a spindle mounted in a generally vertical relation within said carriage the mounting means including a housing in which said spindle is rotatably supported, a pair of spaced trunnions carried by said housing extending radially therefrom, the side portions of said carriage extending down over the ends of the corresponding trunnions, bearings in said carriage supporting said trunnions, and means mounted in said carriage for adjusting said housing angularly on its trunnions in said bearings thereby to place said spindle in a correspondingly tilted position, and graduated indicator means located in ready view on the exterior of one of said outer vertical side portions and operative connections extending from one of said trunnions to said indicator means and operable by angular movement of the trunnion and adapted to indicate the angular position of said spindle said operative connections being arranged and proportioned to provide an amplified movement of the indicator means relative to the rotative movement of the trunnion.

4. In a machine tool, a supporting base, a carriage including outer enclosing side portions mounted on said base, the latter having horizontal ways on which the carriage is translatable, a spindle mounted in said carriage including a housing in which said spindle is rotatably supported, a pair of trunnions carried by said housing extending radially therefrom, bearings in said carriage in which said trunnions are supported, said trunnions being located interiorly of said carriage and normally obscured from view, means mounted in said carriage for angularly adjusting it on its trunnions and thereby the position of said spindle, graduated indicator means located at the exterior of said carriage and exposed to ready view, and operative connections from one of said trunnions extending to said indicator means and operative by rotative movement of the corresponding trunnion to position the indicator means in accordance with the angular position of the trunnion thereby to display on said indicator means the angular position of said spindle.

References Cited in the file of this patent

UNITED STATES PATENTS

| 1,189,557 | Gardner | July 4, 1916 |
| 1,659,228 | Williams | Feb. 14, 1928 |
| 2,297,507 | Schumann | Sept. 29, 1942 |
| 2,375,128 | Miller | May 1, 1945 |

FOREIGN PATENTS

| 544,045 | Germany | Feb. 13, 1932 |